United States Patent
Nakano et al.

(10) Patent No.: US 7,556,410 B2
(45) Date of Patent: Jul. 7, 2009

(54) VEHICLE HEADLIGHT DEVICE

(75) Inventors: Shinichi Nakano, Suita (JP); Yoshinobu Yamamoto, Kakogawa (JP); Mikio Domoto, Kakogawa (JP); Tadashi Nomura, Tokyo (JP); Shoichi Bamba, Tokyo (JP)

(73) Assignees: Kawasaki Jukogyo Kabushiki Kaisha, Hyogo (JP); Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 11/546,687

(22) Filed: Oct. 12, 2006

(65) Prior Publication Data

US 2007/0086203 A1    Apr. 19, 2007

(30) Foreign Application Priority Data

Oct. 13, 2005   (JP)   ............................. 2005-299437

(51) Int. Cl.
   *B60Q 1/00*   (2006.01)
(52) U.S. Cl. .................. 362/469; 362/476; 362/466
(58) Field of Classification Search ................ 362/467, 362/473, 475–476, 465–466
   See application file for complete search history.

(56) References Cited

U.S. PATENT DOCUMENTS

| 5,105,342 | A | * | 4/1992 | Zillgitt et al. ................ 362/514 |
| 5,426,571 | A | * | 6/1995 | Jones .......................... 362/466 |
| 5,896,085 | A | * | 4/1999 | Mori et al. ................... 340/469 |
| 6,012,829 | A | * | 1/2000 | Natchoo ...................... 362/524 |
| 7,052,165 | B2 | * | 5/2006 | Field ........................... 362/524 |
| 2001/0022049 | A1 | * | 9/2001 | Clark et al. .................... 49/360 |
| 2003/0067762 | A1 | * | 4/2003 | Fukawa ....................... 362/37 |
| 2004/0090788 | A1 | * | 5/2004 | Ishida .......................... 362/467 |

FOREIGN PATENT DOCUMENTS

| JP | 62-096148 | * | 5/1987 |
| JP | 2001-347977 | | 12/2001 |

* cited by examiner

*Primary Examiner*—Jong-Suk (James) Lee
*Assistant Examiner*—Julie A Shallenberger (57) ABSTRACT

A headlight device (27) for motor vehicle includes a plurality of headlight units (29 and 30). At least one of those headlight units is a movable headlight unit (30) having a light distribution adjusting mechanism (83) for changing a range of illumination during a cornering of the motor vehicle.

16 Claims, 7 Drawing Sheets

VEHICLE HEADLIGHT DEVICE

BACKGROUND OF THE INVENTION

1. Field of the Invention

The present invention relates to a headlight assembly for a motor vehicle, for example, a motorcycle.

2. Description of the Prior Art

When a motorcycle rider drives on the curved road or at the intersection at night, he or she generally has the limited range of illumination, distributed by a headlight device of the motorcycle, in an area on which the rider's eyes are focused during cornering. This is because a headlight lens and a light emitting element forming part of the headlight device is fixed, so that the headlight device can not direct the light to that area in accordance with the tilting of the motorcycle during the cornering.

In view of this, the Japanese Laid-open Patent Publication No. 2001-347977, published Dec. 18, 2001, for example, discloses an improved headlight device for a motorcycle, in which based on the bank angle of the motorcycle detected by a bank angle detector, a headlight condensing lens and a light emitting element, both forming respective parts of the headlight device, are rotated about their center axis in accordance with the detected bank angle in a direction counter to the direction, in which the motorcycle is tilted during, for example, cornering. This headlight device is advantageous in that during the cornering on the curved road or at the intersection at night, much light can be directed to an area on which the rider's eyes are focused during the cornering, allowing the rider to enjoy a better visibility.

However, the above mentioned Japanese patent publication is directed to the motorcycle of a kind, which utilizes a single headlight system, i.e., the motorcycle having a single headlight, and is silent as to a headlight system which provides the motorcycle with a plurality of, for example, two, headlights. More specifically, the above mentioned Japanese patent publication is silent as to the specific arrangement of two headlights and the use of a control unit for controlling the spatial distribution of headlight illumination.

SUMMARY OF THE INVENTION

In view of the foregoing, the present invention has been devised in view of the foregoing problems and is intended to provide a vehicle headlight device of a type including a plurality of headlight units, which is simple in structure and capable of controlling the spatial distribution of headlight illumination enough to provide a vehicle driver with a better and wide visibility particularly during the cornering in night. In order to accomplish the foregoing object, the present invention in accordance with one aspect thereof provides a headlight device for a motor vehicle, which includes a plurality of headlight units. At least one of those headlight units is a movable headlight unit having a light distribution adjusting mechanism for changing a range of illumination during a cornering of the motor vehicle.

It is to be noted that the term "cornering" is to be understood as including not only a turn of the motor vehicle along a curved road, but also a turn of the motor vehicle at a right-angled corner such as that of a traffic intersection.

According to the present invention, when the movable headlight unit is operated to change the illumination range during the cornering, a relatively large field of view that is illuminated can be secured during the cornering in night.

Preferably, the movable headlight unit is of a low beam type having a downward illuminating characteristic. This is particularly advantageous in that when during the cornering in night, the range of illumination by the low-beam headlight unit is controlled to lie, for example, substantially horizontal, much light can be directed to an area in the traveling direction of the motor vehicle on which the driver's eyes are focused during the cornering in night, to thereby provide a relatively large illuminated field of view.

In a preferred embodiment of the present invention, the light distribution adjusting mechanism may include a light distribution changing mechanism capable of shifting to change the range of illumination and a driving unit for shifting the light distribution changing mechanism. By way of example, if the driving unit is employed in the form of an electric drive motor and the light distribution changing mechanism is designed to be of a rotary type, the light distribution adjusting mechanism of a simplified structure can be obtained.

Preferably, the light distribution adjusting mechanism may also include a position detector for detecting a position of the light distribution changing mechanism, in which case the driving unit and the position detector are positioned on one side of a center of the movable headlight unit adjacent a mid-center plane of the motor vehicle. According to this structural feature, since the driving unit and the position detector, both of which have a relatively large weight, are arranged adjacent the mid-center line of the motorcycle, the mass of the entire headlight device can be centered on a center portion of the motorcycle. The center of the movable headlight unit represents a center as viewed in a front-to-rear direction conforming to the longitudinal direction of the motor vehicle and is normally in alignment with the optical axis of the headlight device.

In another preferred embodiment of the present invention, a stopper may be provided for regulating a range of movement of the light distribution changing mechanism. This is particularly advantageous in that when the light distribution changing mechanism displaces out of the range of movement thereof in the event that the driving unit departs by any reason from its normal operating condition, the displacement of the light distribution changing mechanism is mechanically forcibly halted, protecting the light distribution adjusting mechanism from damage.

Preferably, the light distribution adjusting mechanism includes a driven gear provided in the light distribution changing mechanism and engageable with a drive gear of the driving unit, and a standard position detector for detecting a standard position of the light distribution changing mechanism. The driving unit and the standard position detector are disposed on respective sides of the center of the movable headlight unit in opposition to each other.

According to this structural feature, when the movable headlight unit is held at the standard position, the driving unit and the driven gear engage with each other at a position substantially intermediate of the circumference of the driven gear having an angle corresponding to the range of rotation, over which the light distribution changing mechanism can rotate. Accordingly, when the standard position detector is disposed at a position remotest from the driving unit and on one side of the lamp axis of the movable headlight unit opposite to the driving unit, it is possible to avoid contact of opposite ends of the driven gear, then reaching the maximum point of the range of rotation thereof, with the standard position detector.

The present invention in accordance with another aspect thereof provides a headlight device for a motor vehicle, which includes a headlight unit having a light distribution adjusting mechanism for changing a range of illumination during a cornering of the motor vehicle. The light distribution adjusting mechanism includes a light illumination changing mechanism capable of shifting to change the range of illumination and a driving unit for shifting the light distribution changing mechanism. The headlight device further includes a forcible shift member for manually shifting the light distribution changing mechanism.

According to this aspect of the present invention, the provision of the forcible shift member is particularly advantageous in that in the event that by any reason, the light distribution adjusting mechanism malfunctions, the headlight unit can be manually reset to, for example, a standard position for the continued operation of the motorcycle.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Hereinafter, a preferred embodiment of the present invention will be described in detail with reference to the accompanying drawings.

Figure 1:
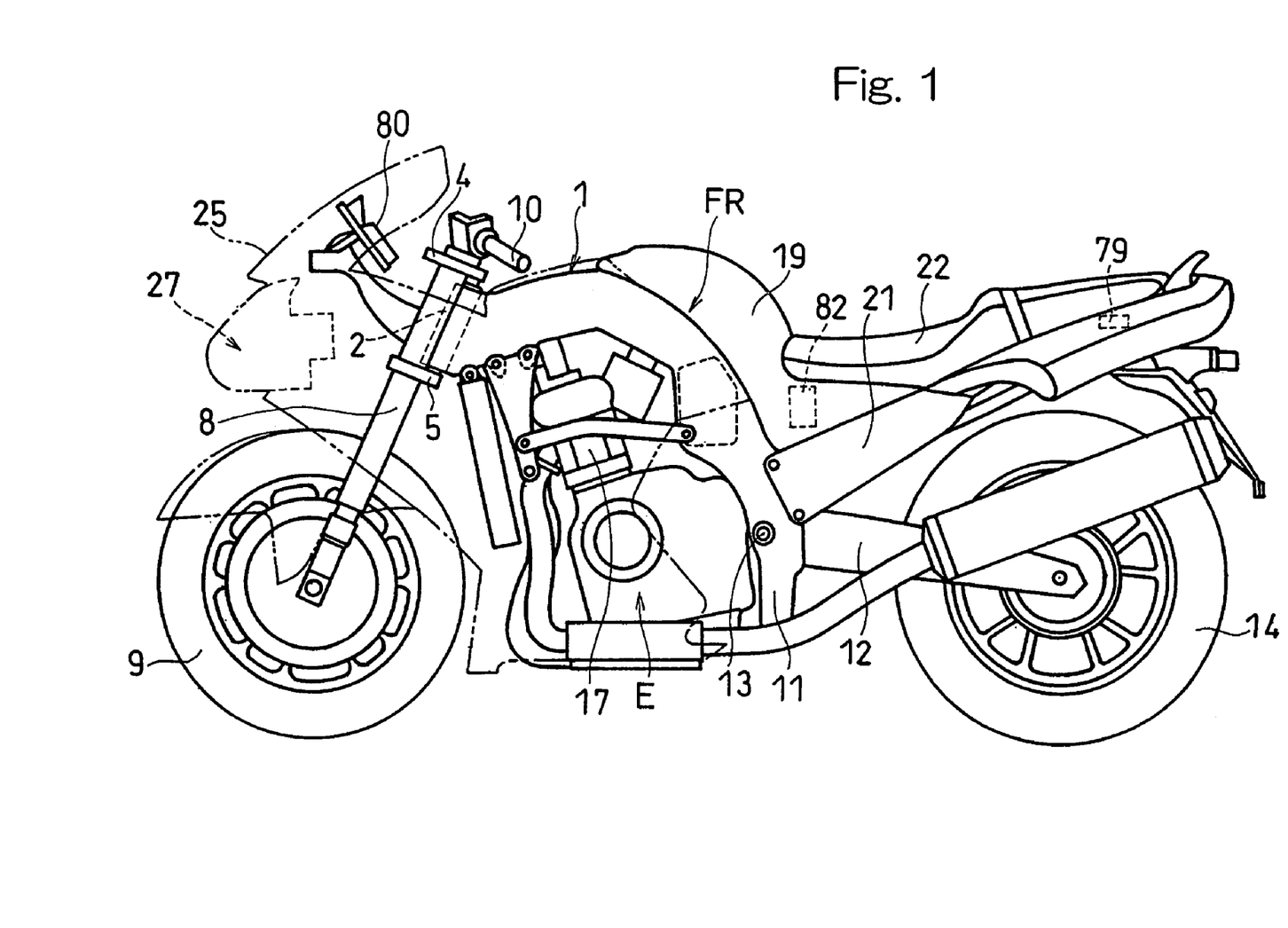
FIG. 1 is a schematic side view of a motorcycle equipped with a headlight device according to a preferred embodiment of the present invention.

FIG. 1 is a side view of a motorcycle equipped with a headlight device according to the embodiment of the present invention. As shown therein, the motorcycle includes a motorcycle frame structure FR made up of a main frame 1, forming a front half of the motorcycle frame structure FR, and a rear frame 21 forming a rear half of the motorcycle frame structure FR and rigidly coupled with a rear portion of the main frame 1.

A head tube 2 is secured to a front portion of the main frame 1. Upper and lower brackets 4 and 5 are supported through a steering shaft (not shown) that is rotatably inserted through the head tube 2. The upper and lower brackets 4 and 5 support front fork members 8, with a front wheel 9 being rotatably supported by respective lower ends of the front fork members 8. A steering handlebar 10 is mounted on the upper bracket 4 at respective upper ends of the front fork members 8.

The main frame 1 is provided at a rear lower portion with swingarm brackets 11, with which a swingarm 12 is connected through a pivot pin 13 for pivotal movement up and down about the pivot pin 13. This swingarm 12 carries a rear drive wheel 14 rotatably supported by a rear end thereof. A multi-cylinder combustion engine E is supported at a position below an intermediate portion of the main frame 1.

A unitary seat 22 having a rider's seat area and a fellow passenger's seat area is mounted on the rear frame 21. A fuel tank 19 is fixedly mounted on an upper portion of the main frame 1 between the handlebar 10 and the unitary seat 22. A fairing 25 made of a synthetic resin is fixedly mounted on a front portion of the motorcycle frame structure FR to cover a front to side region of the motorcycle frame structure FR, including a front area forwardly of the handlebar 10 and side areas generally laterally of the motorcycle engine E, as shown by the double-dotted line. A headlight device 27 is also mounted on this fairing 25.

Figure 2:
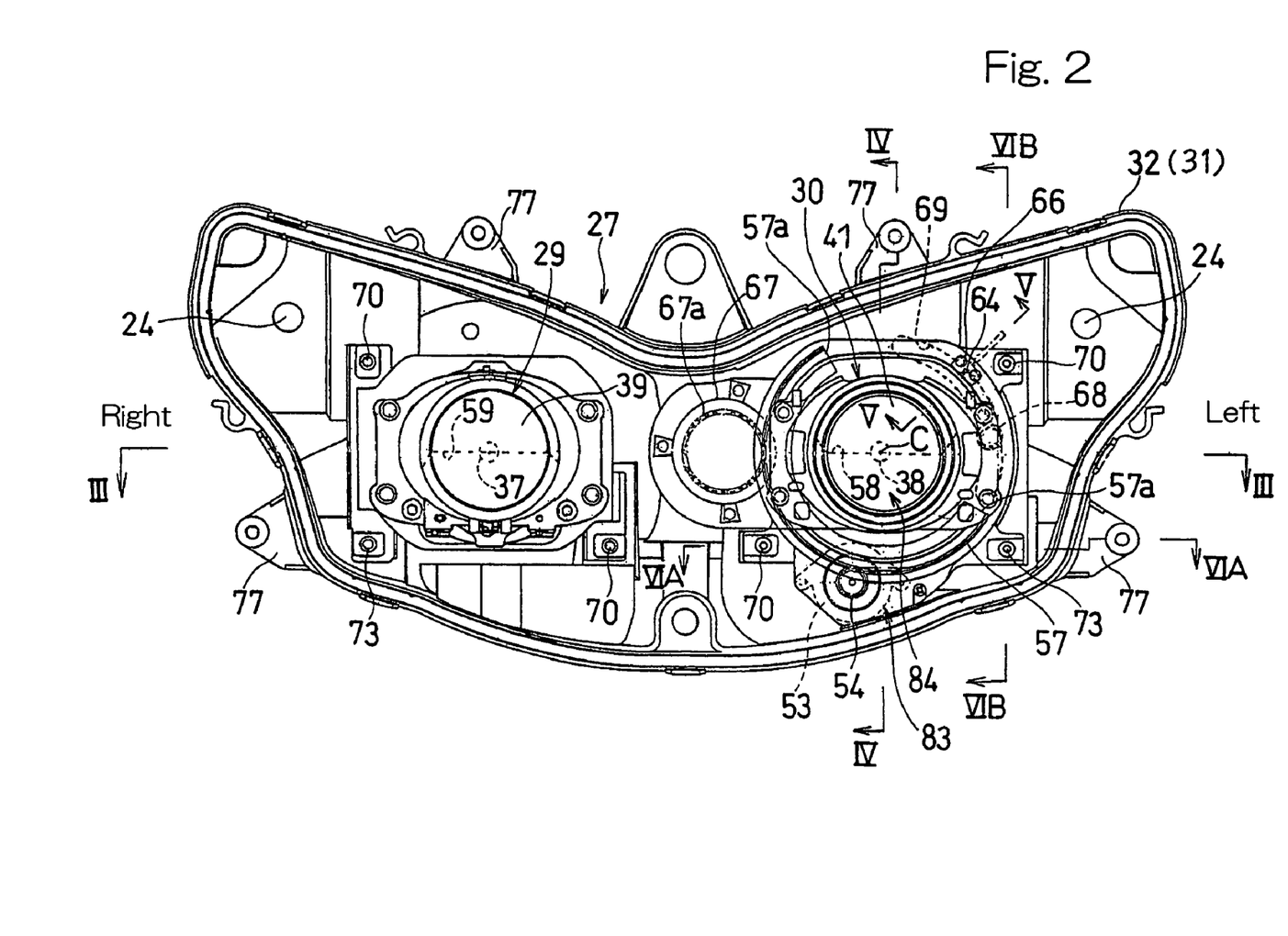
FIG. 2 is a front elevational view of the headlight device.
Figure 3:
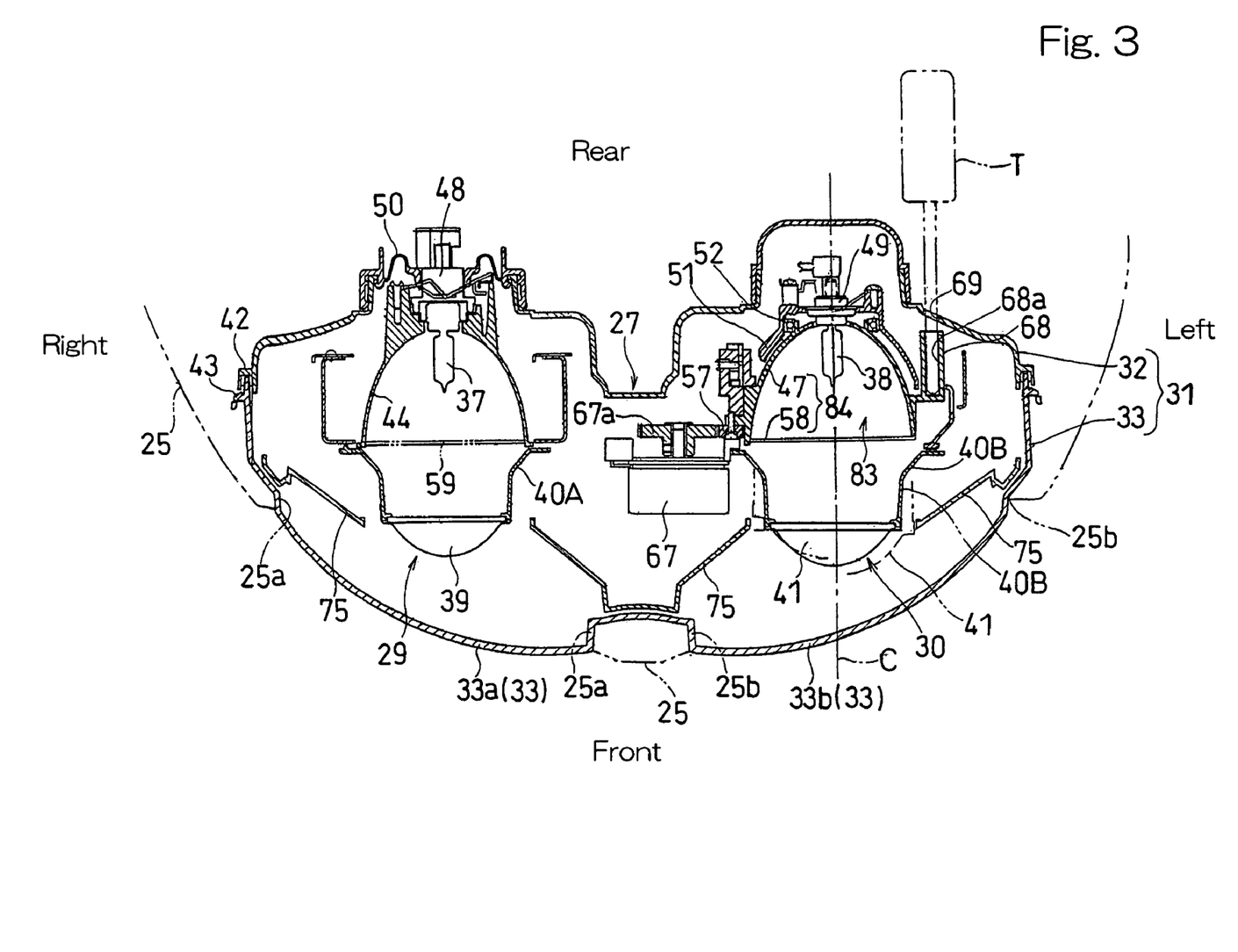
FIG. 3 is a cross-sectional view taken along the line III-III in FIG. 2.

FIG. 2 illustrates a front elevational view of the headlight device 27 with a front cover 33 (FIG. 3) removed away and FIG. 3 is a cross-sectional view taken along the line III-III in FIG. 2. As shown in FIG. 2, the headlight device 27 is a so-called double headlight system and includes a fixed headlight unit 29 for emission of a high beam and a movable headlight unit 30 for emission of a low beam. The right and left headlight units 29 and 30 are held in the same horizontal plane and positioned on right and left sides with respect to the motorcycle. Since FIG. 2 illustrates the front elevational view, a headlight unit shown in a left portion of the drawing of FIG. 2 represents the right headlight unit 30 whereas a headlight unit shown in a right portion of the drawing of FIG. 2 represents the left headlight unit 29. The headlight device 27 also includes left and right positioning lamp 24 and 24, which are, when viewed from front as shown in FIG. 2, positioned diagonally upwardly of the left headlight unit 30 and the right headlight unit 29, respectively.

As shown in FIG. 3, the headlight device 27 includes a lamp casing 31 made up of a rear casing body 32 and a transparent front covering 33 joined together with the rear casing body 32. The rear casing body 32 is made of a synthetic resin and has a grooved flange 42 formed at an outer peripheral edge portion thereof and, on the other hand, the front covering 33 is also made of a synthetic resin and has a projecting flange 43 formed at an outer peripheral edge portion thereof. The rear casing body 32 and the front covering 33 are joined together by engaging the projecting flange 43 in the grooved flange 42 to define the lamp casing 31.

The front covering 33 has a surface formed with left and right lamp lens areas 33b and 33a each having a multiplicity of surface indentations that provide a light distributing function.

Referring to FIG. 3, the fixed headlight unit 29 is positioned inside the lamp casing 31 and held in alignment with the right lamp lens area 33a of the front covering 33. Specifically, this fixed headlight unit 29 includes a light emitting element 37 in the form of an electric bulb, a right projection lens 39 disposed between the light emitting element 37 and the right lamp lens area 33a, and a right support member 40A, through which the right projection lens 39 is supported on the rear casing body 32.

Similarly, the movable headlight unit 30 is positioned inside the lamp casing 31 and held in alignment with the left lamp lens area 33b of the front covering 33. This movable headlight unit 30 includes a light emitting element 38 in the form of an electric bulb, a left projection lens 41 disposed between the light emitting element 38 and the left lamp lens area 33b, and a left support member 40B, through which the left projection lens 41 is supported on the rear casing body 32.

Each of the right and left support members 40A and 40B is in the form of a casting formed by the use of an aluminum alloy and is of a shape flaring rearwardly outwardly. Each of the projection lenses 39 and 41, when viewed from front as in FIG. 2, represents a substantially round shape.

Each of the fixed and movable headlight units 29 and 30 is provided with a right (or fixed) or left (or rotatable) reflector 44 or 47 for collecting rays of light emitted from the respective light emitting element 37 or 38 and also provided with a respective socket 48 or 49 disposed at a location corresponding to a bottom center area of the corresponding reflector 44 or 47 for receiving and supporting the light emitting element 37 or 38. The respective reflector 44 or 47 is made of an aluminum alloy and shaped to represent a generally bowl-like shape, having an inner surface vapor-deposited with a reflecting film in the form of an aluminum thin film. The socket 48 in the fixed headlight unit 29 is fixed to the right reflector 44 and fitted displaceably to the rear casing body 32 through an elastic coupling 50. On the other hand, the left rotatable reflector 47 has a base end portion rotatably supported by a holder 51, fixed to the rear casing body 32, through a bearing member 52 so that the left reflector 47 can rotate about a lamp axis C passing through the center of the left light emitting element 38 and the center point of the left projection lens 41 in a front-to-rear direction of the left projection lens 41. The lamp axis C of the left headlight unit 30 is generally in alignment with the optical axis. The detail of the fixing of the holder 51 to the rear casing body 32 will be described later.

Figure 4A:
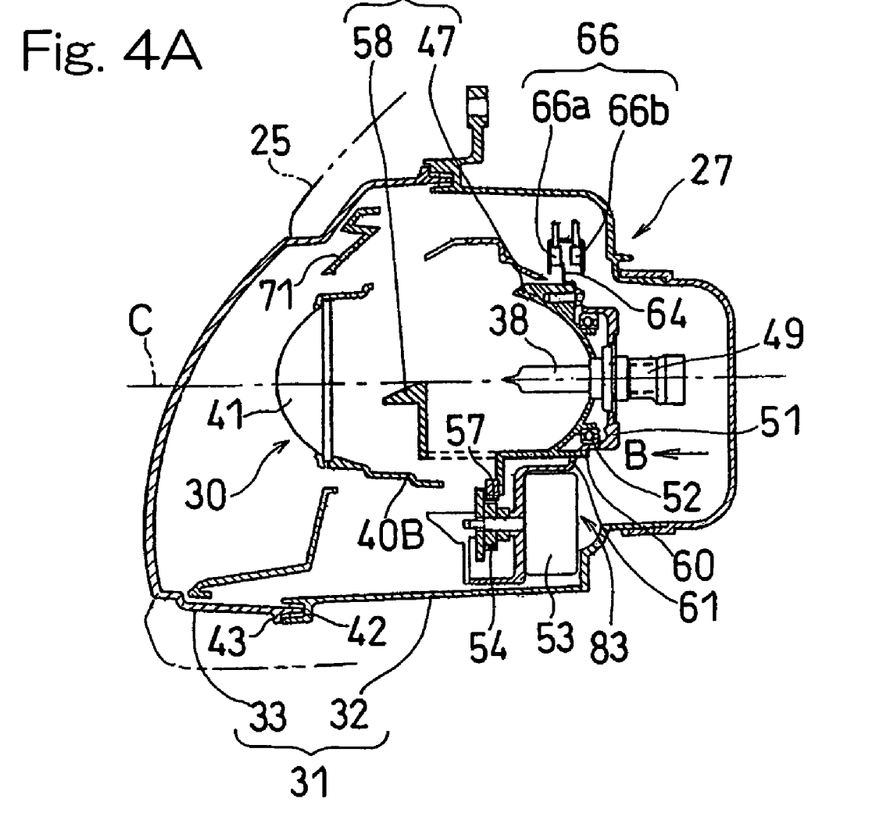
FIG. 4A is a cross-sectional view taken along the line IV-IV in FIG. 2.

As shown in FIG. 4A showing a cross-sectional view taken along the line IV-IV in FIG. 2, the holder 51 has a driving unit 53 in the form of an electric stepper motor fixed thereto and forming a part of a light distribution adjusting mechanism 83 as will be described in detail later. This driving unit 53 has a motor shaft having a drive gear 54 mounted thereon. On the other hand, the left rotatable reflector 47 is provided with a driven gear 57 engageable with the drive gear 54 so that rotation of the driving unit 53 can be transmitted to the left reflector 47. As shown in FIG. 2, the driven gear 57 is of a substantially arcuate shape extending around the lamp axis C, about which the movable headlight unit 30 rotates.

As shown in FIG. 4A, the left rotatable reflector 47 is formed integrally with a low beam shielding member 58 positioned in a forwardly lower area of the light emitting element 38. This low beam shielding member 58 is operable to shield rays of light, which have been emitted from the light emitting element 38 and subsequently reflected from the left reflector 47, from traveling diagonally upwards and then to allow them to be directed downwards or towards a lower region forwardly of the motorcycle. Accordingly, the movable headlight unit 30 is designed as a low beam headlight having a downward illuminating characteristic. The left reflector 47 and the low beam shielding member 58, which form respective movable elements of the movable headlight unit 30, constitute a light distribution changing mechanism 84. This light distribution changing mechanism 84 and the driving unit 53 in turn constitute the light distribution adjusting mechanism 83 operable to change a range illuminated by the movable headlight unit 30. The light distribution changing mechanism 84 is operable to move in accordance with the change of the range to be illuminated.

On the other hand, the right reflector 44 of the fixed headlight unit 29 is formed integrally with a high beam shielding member 59 (See FIG. 2.) for restricting rays of light, which have been emitted from the light emitting element 37 and subsequently reflected from the right reflector 44, from traveling diagonally downwards and then allowing them to be directed upwards. Accordingly, the fixed headlight unit 29 is designed as a high beam headlight having a upward illuminating characteristic.

Figure 4B:
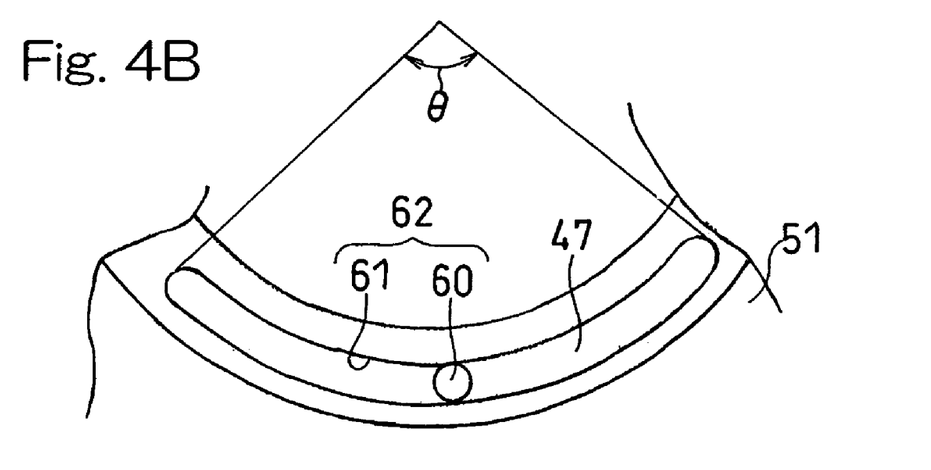
FIG. 4B is a diagram showing, on an enlarged scale, a portion of the headlight device as viewed in a direction indicated by an arrow B in FIG. 4A.

As shown in FIG. 4B, showing a portion of the left headlight unit 30 as viewed in a direction indicated by the arrow B in FIG. 4A, the left rotatable reflector 47 is also formed integrally with an engagement pin 60 protruding rearwardly therefrom, which pin 60 is movably engaged in an arcuate guide slot 61 defined in the holder 51. The arcuate guide slot 61 extends angularly a distance corresponding to the angle θ of rotation of the driven gear 57 and, hence, the angle θ of rotation of the left rotatable reflector 47 about the lamp axis C. The angle θ of rotation of the driven gear 57 and, hence, the left reflector 47 is chosen to be, for example, 100°. Accordingly, the engagement pin 60 cooperates with the arcuate guide slot 61 to define a stopper 62 for regulating the angle of rotation of the rotatable reflector 47.

Figure 5:
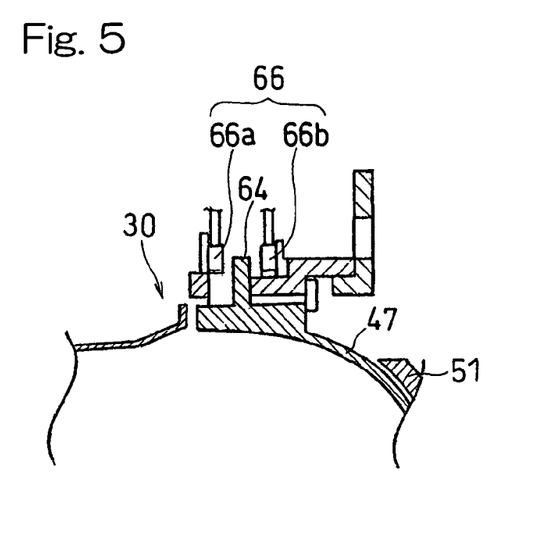
FIG. 5 is a cross-sectional view taken along the line V-V in FIG. 2.

Referring to FIG. 5, the rotatable reflector 47 has a to-be-detected element 64 in the form of a square bar that is secured thereto to extend radially outwardly from the rotatable reflector 47. This to-be-detected element 64 defines a standard position of the movable headlight unit 30. When the movable headlight unit 30 is held in the standard position, the to-be-detected element 64 can be detected by a standard position detector 66 made up of a light projecting element 66a and a light receiving element 66b.

The standard position detector 66 is, as shown in FIG. 2, positioned at a location on one side of the lamp axis C of the movable headlight unit 30 generally opposite to the driving unit 53. In the illustrated embodiment, the standard position detector 66 is held at the location angularly spaced, for example 150° about the lamp axis C from the driving unit 53. The standard position represents a normal position assumed by the movable headlight unit 30 during the straight forward drive of the motorcycle and is, when expressed in terms of the angle of rotation of the right rotatable reflector 47, represented by a zero angle position.

Although the standard position detector 66 has been described as an optical type, it may not be always limited to the optical type, but may be of a magnetic type including a magnetic sensor or of any other type.

Referring to FIG. 2, a potentiometer 67 for detecting a position of the arcuate driven gear 57 of the rotatable reflector 47 is disposed at a location laterally outwardly of the movable headlight unit 30 and generally intermediate of the lamp casing 31 in a left-to-right direction and is fixed to the holder 51 shown in FIG. 3. This potentiometer 67 is driven by a meter driving gear 67a that is engaged with the arcuate driven gear 57 fixed to, or formed integrally with the rotatable reflector 47. The meter driving gear 67a has a brush (not shown) that is fixed thereto so as to slidingly engage an arcuate resistance element (not shown) so that the potentiometer 67 can provide an output indicative of the resistance read out by the brush and, hence, indicative of the angle of rotation of the rotatable reflector 47. As a matter of design, this potentiometer 67 is an analog detector for detecting the angle of rotation of the rotatable reflector 47 in terms of a change in resistance read out by the brush.

As shown in FIG. 3, the rotatable reflector 47 is formed integrally with a tubular, forcible shift member 68 having an insertion hole 68a defined therein for receiving a shank of a tool T such as a screw driver. On the other hand, a portion of the rear casing body 32 confronting the forcible shift member 68 is formed with an insertion slot 69 extending arcuately an angle of about 100° about the lamp axis C as shown in FIG. 2. When the shank of the tool T is inserted from outside of the rear casing body 32 into the insertion hole 68a of the shift member 68 through the insertion slot 69 and the tool T is subsequently moved manually along the slot 69 in either direction about the lamp axis C to shift the forcible shift member 68, the rotatable reflector 47 can be manually forcibly rotated about the lamp axis C.

Figures 6A, 6B:
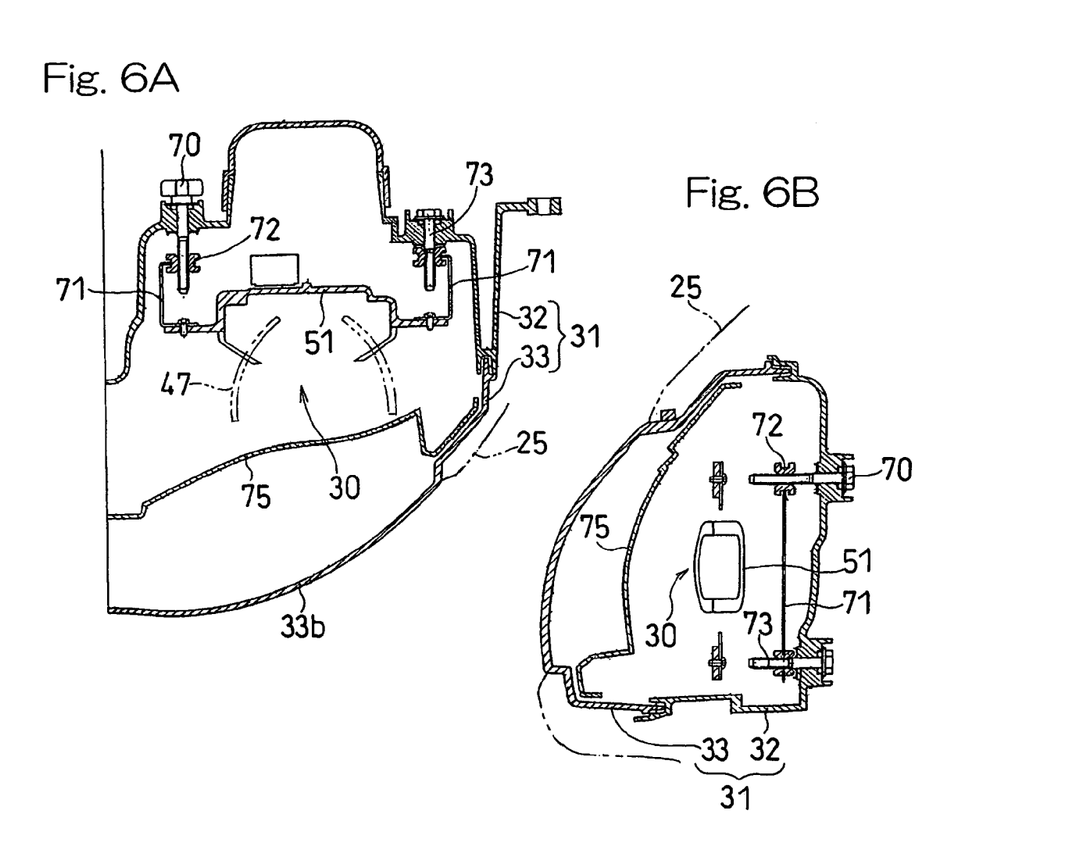
FIG. 6A is a cross-sectional view taken along the line VIA-VIA in FIG. 2.
FIG. 6B is a cross-sectional view taken along the line VIB-VIB in FIG. 2.

FIGS. 6A and 6B illustrate respective cross-sectional views taken along the lines VIA-VIA and VIB-VIB in FIG. 2. As shown in FIG. 6A, a portion of the rear casing body 32 in the vicinity of the movable headlight unit 30 has an optical axis adjustment bolt 70 fitted rotatably thereto. This optical axis adjustment bolt 70 has an externally threaded shank extending through a nut 72 fixedly mounted on a bedplate 71 supporting the holder 51. Also, another portion of the rear casing body 32 generally opposite to the optical axis adjustment bolt 70 has a fulcrum pin 73 fixed thereto while extending inwardly of the rear casing body 32. The bedplate 71 is rockingly fitted to the fulcrum pin 73. As shown in FIG. 2, the optical axis adjustment bolt 70 is employed in four in total number, two of which are positioned on the upper left side and the lower right side of the movable headlight unit 30 and the other two of which are positioned on the upper right side and the lower left side of the fixed headlight unit 29, while the fulcrum pin 73 is employed in two in number, one of which is positioned on the lower left side of the movable headlight unit 30 and the other of which is positioned on the lower right side of the fixed headlight unit 29.

When the optical axis adjustment bolts 70 and 70, one of which is shown in FIGS. 6A and 6B, are turned in either direction, the bedplate 71 can be shifted forwards or rearwards through the associated nuts 72 and 72. Once the bedplate 71 is so shifted, the holder 51, the light emitting element 37, the support member 40B and the projection lens 40, that is, the movable headlight unit 30 in its entirety shown in FIG. 3, can be tilted about the fulcrum pins 73, shown in FIGS. 6A and 6B, to thereby variably adjust the direction of the optical axis of the movable headlight unit 30.

It is to be noted that as shown in FIG. 2, two optical axis adjustment bolts 70 and a fulcrum pin 73 are equally employed for the fixed headlight unit 29 in a manner similar to that described above in connection with the movable headlight unit 30 so that the optical axis of the fixed headlight unit 29 can be adjusted similarly.

As shown in FIG. 3, in order to conceal surroundings of the right and left projection lenses 39 and 41 from view through the transparent front covering 33, an extension 75 is positioned forwardly of the projection lenses 39 and 41 and inwardly of the transparent front covering 33.

The headlight device 27 is mounted on the fairing 25 (shown in FIG. 1) in the following manner. Specifically, as shown in FIG. 2, the casing body 32 has four spaced mounting lugs 77 provided in a perimeter of the casing body 32 so as to protrude outwardly therefrom. A portion of the fairing 25, where the headlight device 27 is mounted, has laterally spaced two openings 25a and 25b defined therein as shown in FIG. 3. Hence, while the headlight device 27 is mounted on the fairing 25 with the right and left lamp lens areas 33a and 33b positioned inside the openings 25a and 25b, respectively, the mounting lugs 77 of the casing body 32 are fixedly connected to corresponding mounts (not shown) formed in a rear surface of the fairing 25, thereby allowing the fairing 25 to support the headlight device 27.

Figure 7:
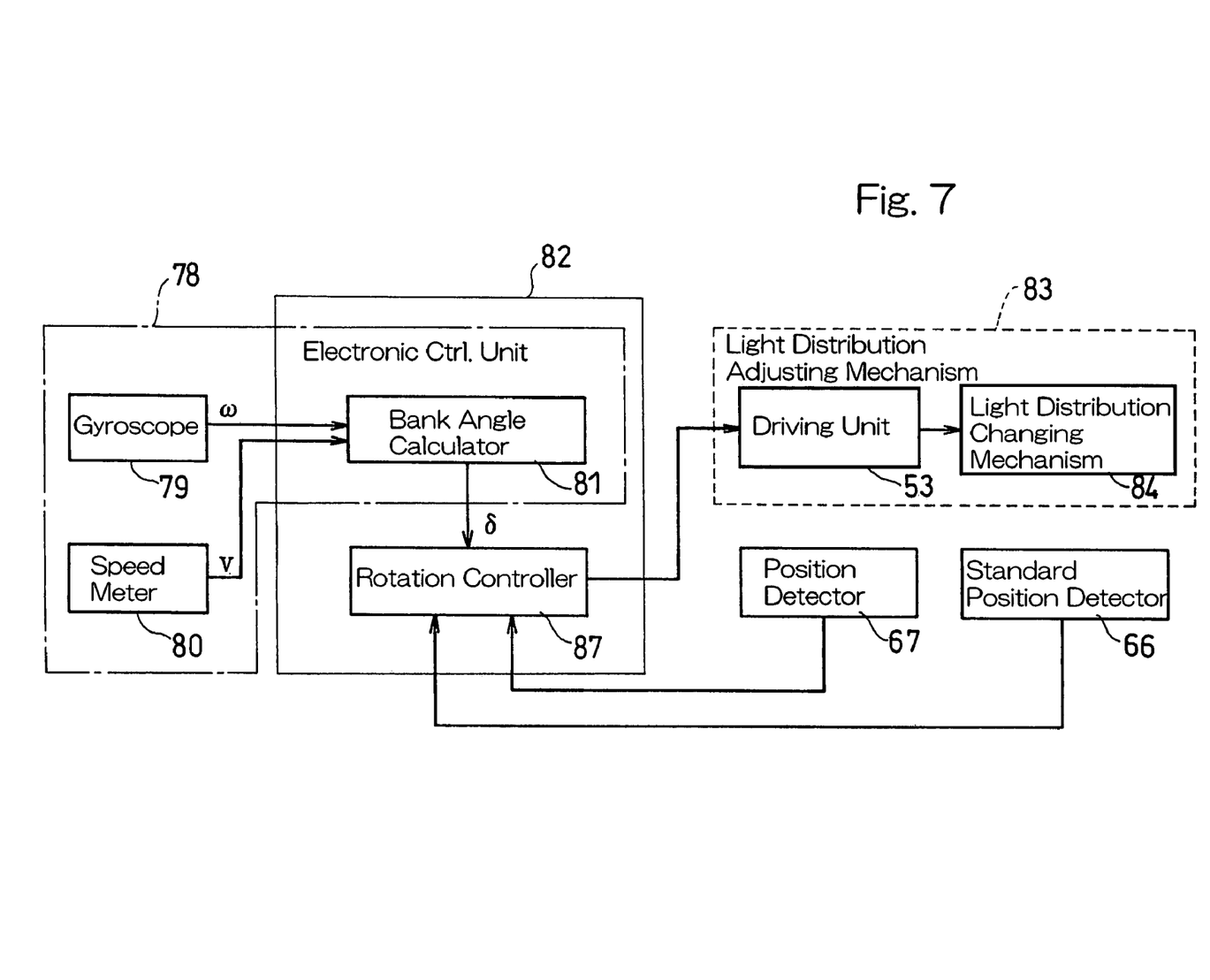
FIG. 7 is a block circuit diagram showing an electric control system for the headlight device.

Referring to FIG. 7, showing a block circuit diagram of an electric control system of the headlight device 27, a bank angle detector 78 is used to detect the bank angle δ of the motorcycle shown in FIG. 1, that is, the angle of tilt of the motorcycle in either leftward or rightward direction with respect to the mid-center plane of the motorcycle frame structure FR in the longitudinal direction of the motorcycle.

The bank angle detector 78 employed in the illustrated embodiment is operable to detect the bank angle δ in reference to the rotational angular velocity ω in a horizontal plane of the motorcycle and the velocity v of the motorcycle. For this purpose, the bank angle detector 78 includes a gyroscope 79 for measuring the rotational angular velocity ω of the motorcycle, a speedometer 80 for measuring the motorcycle traveling velocity v, and a bank angle calculator 81 for calculating the bank angle δ using the rotational angular velocity ω and the speed v.

The bank angle calculator 81 is built in an electronic control unit 82 that is used to control the entire electric system of the motorcycle. The electronic control unit 82 has also built therein a drive controller 87 for controlling the driving unit 53 of the light distribution adjusting mechanism 83 on the basis of the calculated bank angle δ so that the light distribution changing mechanism 84 of the movable headlight unit 30 can be rotated an angle, corresponding to the bank angle δ, in a direction counter to the direction in which the motorcycle is tilted. As shown in FIG. 1, the gyroscope 79 is mounted on a rear portion of the motorcycle frame structure FR, the speedometer 80 is mounted on a front portion of the motorcycle frame structure FR above the headlight device 27, and the electronic control unit 82 is mounted on a generally intermediate portion of the motorcycle frame structure FR below the unitary seat 22.

The operation of the headlight device 27 will now be described. When, for example, the motorcycle moving in night turns, i.e., corners either leftwards or rightwards, the bank angle calculator 81 calculates the bank angle δ and, based on the bank angle δ so calculated, the drive controller 87 controls the rotation of the driving unit 53. Accordingly, the rotatable reflector 47 and the low beam shielding member 58 are turned in a direction counter to the direction in which the motorcycle is tilted.

The drive controller 87 performs a feedback control to halt the driving unit 53 when the rotational angle of the rotatable reflector 47 from the standard position, which is detected by the potentiometer 67 serving as a position detector, attains a value corresponding to the detected bank angle δ. In this way, the rotatable reflector 47 and the low beam shielding member 58, both shown in FIG. 4A, are turned in a direction counter to the direction, in which the motorcycle is tilted during the cornering, through an angle corresponding to the bank angle δ.

Figure 8:
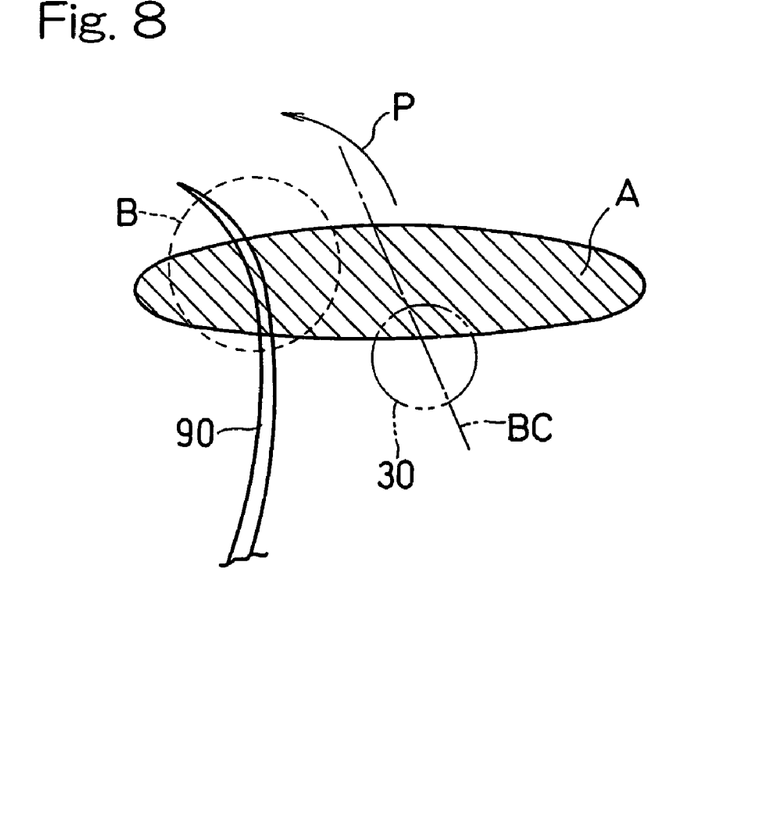
FIG. 8 illustrates an area of the road surface forwardly of the motorcycle, showing how light projected from the headlight device of the present invention is distributed during the leftward cornering in night.

Thus, as shown in FIG. 8, when the motorcycle changes its direction of travel to move along a curved lane 90 in, for example, a leftward direction shown by the arrow-headed line P (i.e., during the leftward cornering), the range of illumination (pattern of light distribution) A from the movable headlight unit 30 deploys substantially horizontally since the movable headlight unit 30 rotates rightwards, when viewed from rear, in correspondence with a banking of a center line BC of the motorcycle frame structure FR as viewed in a direction conforming to the longitudinal direction of the motorcycle frame structure FR.

Figure 9:
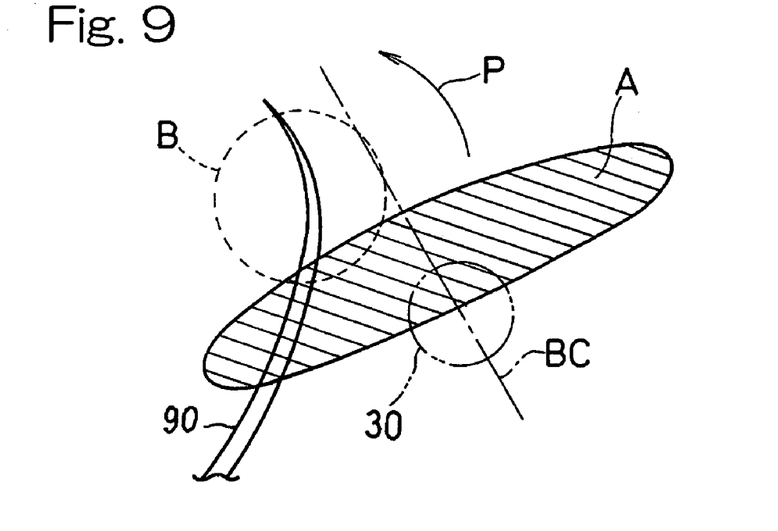
FIG. 9 illustrates an area of the road surface forwardly of the motorcycle showing how light projected from the conventional headlight device is distributed during the leftward cornering in night.

As a result, the amount of light distributed by the headlight device 27 in a portion of the lane 90 inwardly of the direction of travel, to which the driver's (or rider's) eyes are focused, that is, in an area encompassed by the phantom circle B in FIG. 8 is more than the amount of light distributed in the area B by the conventional headlight device shown in FIG. 9, in which the pattern of light distribution A does not deploy horizontally and tends to be skewed leftwards in correspondence with a banking of the center line BC. Accordingly, it is clear that with the headlight device 27 of the present invention, much light can be directed to the area B forwardly of the motorcycle during the cornering in night, to thereby provide a driver with a better visibility.

It is to be noted that since the movable headlight unit 30 is designed as a low beam headlight having a downward illuminating characteristic, much light can be distributed effectively in an area inwardly of the direction of travel, where the driver's eyes are focused, that is, in the area B in FIGS. 8 and 9, during the cornering in night, thereby allowing the motorcycle driver to enjoy a better visibility.

In the embodiment described hereinabove, the rotatable reflector 47 and the low beam shielding member 58 can be quickly rotated an angle consistent with the bank angle δ since the rotatable reflector 47 and the low beam shielding member 58 are rotated at an angular velocity of 110°, preferably 200° per second at maximum, depending on the speed of change of the bank angle δ.

The headlight device 27 of the two headlight system shown in FIG. 2 is so designed that of the two headlight units 29 and 30, only one of them is made rotatable, i.e., the movable headlight unit 30. Accordingly, the light distribution adjusting mechanism 83 can be assembled compact in size and simple in structure as compared with the case, in which both of the headlight units 29 and 30 are made rotatable. Also, since the light distribution adjusting mechanism 83 is of a structure including the light distribution changing mechanism 84, shown in FIG. 4A, and the driving unit 50 in the form of a motor for displacing the light distribution changing mechanism 84, the structure of the light distribution adjusting mechanism 83 can be simplified.

Also, since the driving unit 53 of the light distribution adjusting mechanism 83 and the potentiometer 67 shown in FIG. 2 serving as a position detector, both of which have a relatively large weight, are arranged on one side of the lamp axis C, which is a center of the movable headlight unit 30, adjacent the mid-center line of the motorcycle, the mass of the entire headlight device 27 can be centered on a center portion of the motorcycle frame structure FR. Moreover, since in this headlight device 27 the compact projection lenses 39 and 41 are employed, the space for accommodating the driving unit 53 and the potentiometer 67 (FIG. 2) can easily be secured. In addition, in the event that the driving unit 53 shown in FIG. 2 departs by any reason from its normal operating condition to cause the light distribution changing mechanism 54 to displace out of the predetermined range of movement, the displacement of the light distribution changing mechanism 84 is mechanically forcibly halted, protecting the light distribution adjusting mechanism 83 from damage.

Since the driving unit 53 and the standard position detector 66 are arranged on respective sides of the lamp axis C in opposition to each other as shown in FIG. 2, the following effects can be obtained. Namely, when the movable headlight unit 30 is held at the standard position, the driving unit 53 and the arcuate driven gear 57 engage with each other at a position substantially intermediate of the circumference of the driven gear 57 having an angle corresponding to the range of rotation, over which the light distribution changing mechanism 84 can rotate. Accordingly, when the standard position detector 66 is disposed at a position remotest from the driving unit 53 and on one side of the lamp axis C of the movable headlight unit 30 opposite to the driving unit 53, it is possible to avoid contact of opposite ends 57a and 57a of the driven gear 57, then reaching the maximum point of the range of rotation thereof, with the standard position detector 66.

Yet, since the forcible shift member 68 is provided for manually shifting the rotatable reflector 47 as shown in FIG. 3, the movable headlight unit 30 can be manually reset to, for example, the standard position for the continued operation of the motorcycle, in the event that by any reason, the light distribution adjusting mechanism 83 malfunctions.

It is to be noted that other than the two headlight system described in connection with the embodiment of the present invention, the present invention can be equally applied to the four headlight system, in which four headlights are arranged in line horizontally, and any other headlight system, in which a plurality of headlights are arranged in line vertically. In the case of the four headlight system including two headlight units on each side of the motorcycle, leftmost and rightmost headlight units, for example, may be configured to represent the movable headlight units, such that the leftmost movable headlight unit is rotated during the leftward cornering of the motorcycle whereas the rightmost movable headlight unit is rotated during the rightward cornering of the motorcycle. Also, of the four headlight units, three or one of them may be configured to represent the movable headlight unit. Alternatively, all of the four headlight units may be configured to represent the movable headlight units.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in the foregoing embodiment the potentiometer has been shown and described as used for the position detector 67, any other detector capable of detecting the rotation angle, for example, an encoder or a Hall sensor can be employed therefor.

Also, the present invention can be applied not only to the headlight system of the motorcycle, but also to the headlight system of a three-wheel or four-wheel motor vehicle or any other motor vehicle.

Accordingly, such changes and modifications are, unless they depart from the scope of the present invention as delivered from the claims annexed hereto, to be construed as included therein.

What is claimed is:

1. A headlight device for a motorcycle, which comprises:
   a pair of headlight units disposed laterally on right and left sides with respect to the motorcycle, in which at least one of those headlight units is a movable headlight unit including a light distribution adjusting mechanism for changing a range of illumination during a cornering of the motorcycle; and
   a bank angle detector for detecting a bank angle of the motorcycle, including a gyroscope to measure a rotational angular velocity of the motorcycle, a speedometer for measuring a traveling velocity of the motorcycle, and a bank angle calculator for calculating a bank angle of the motorcycle using the rotational angular velocity and the traveling velocity of the motorcycle,
   wherein the light distribution adjusting mechanism adjusts the movable headlight unit based on the detected bank angle, and the light distribution adjusting mechanism includes a light distribution changing mechanism configured for shifting to change the range of illumination and a driving unit for shifting the light distribution changing mechanism,
   wherein the light distribution adjusting mechanism also includes a position detector for detecting a position of the light distribution changing mechanism, and wherein the driving unit and the position detector are positioned on one side of a center of the movable headlight unit and adjacent a mid-center plane in the width direction of the motorcycle.

2. The headlight device for the motorcycle as claimed in claim 1, wherein the movable headlight unit is of a low beam type having a downward illuminating characteristic.

3. The headlight device for the motorcycle as claimed in claim 1, further comprising a stopper for regulating a range of movement of the light distribution changing mechanism.

4. The headlight device for the motorcycle as claimed in claim 1, wherein the light distribution adjusting mechanism further includes a driven gear provided in the light distribution changing mechanism and engageable with a drive gear of the driving unit, and a standard position detector for detecting a standard position of the light distribution changing mechanism and wherein the driving unit and the standard position detector are disposed on respective sides of a center of the movable headlight unit in opposition to each other.

5. The headlight device for the motorcycle as claimed in claim 1, further comprising a forcible shift member for manually shifting the light distribution changing mechanism.

6. The headlight device for the motorcycle as claimed in claim 1 further comprising a fixed headlight unit.

7. The headlight device for the motorcycle as claimed in claim 1 wherein the movable headlight unit further includes a light emitting element and a rotatable reflector for collecting rays of light emitted from the light emitting element.

8. The headlight device for the motorcycle as claimed in claim 7 further comprising a potentiometer for detecting a position of the rotatable reflector of the movable headlight unit.

9. The headlight device for the motorcycle as claimed in claim 8 further comprising a drive controller to halt a rotation of the rotatable reflector based on the potentiometer.

10. The headlight device for the motorcycle as claimed in claim 4 wherein the standard position detector is an optical type.

11. A headlight device for a motorcycle including a pair of headlight units disposed laterally on right and left sides with respect to the motorcycle comprising:
   a fixed headlight unit;
   a movable headlight unit including
   a light distribution adjusting mechanism for changing a range of illumination during a cornering of the motorcycle,
   a light emitting element, and
   a rotatable reflector for collecting rays of light emitted from the light emitting element;
   a potentiometer for detecting a position of the rotatable reflector of the movable headlight unit;
   a drive controller to halt a rotation of the rotatable reflector based on the potentiometer; and
   a bank angle detector for detecting a bank angle of the motorcycle including
   a gyroscope to measure a rotational angular velocity of the motorcycle,
   wherein the light distribution adjusting mechanism adjusts the movable headlight unit based on the detected bank angle, and
   wherein the potentiometer is positioned on one side of a center of the movable headlight unit and adjacent a mid-center plane in the width direction of the motorcycle.

12. The headlight device for the motorcycle as claimed in claim 11, wherein the movable headlight unit and the fixed headlight unit are disposed on right and left sides with respect to a mid-center plane in the width direction of the motorcycle.

13. The headlight device for the motorcycle as claimed in claim 12, wherein the potentiometer is disposed between the movable headlight unit and the fixed headlight unit.

14. A headlight device for a motorcycle including a pair of headlight units disposed laterally on right and left sides with respect to the motorcycle comprising:
   a fixed headlight unit;
   a movable headlight unit including
   a driving unit,
   a light distribution adjusting mechanism for changing a range of illumination during a cornering of the motorcycle,
   a light emitting element, and
   a rotatable reflector for collecting rays of light emitted from the light emitting element;
   a potentiometer for detecting a position of the rotatable reflector of the movable headlight unit;
   a drive controller to halt a rotation of the rotatable reflector based on the potentiometer; and
   a bank angle detector for detecting a bank angle of the motorcycle including
   a gyroscope to measure a rotational angular velocity of the motorcycle,
   wherein the light distribution adjusting mechanism adjusts the movable headlight unit based on the detected bank angle, and
   wherein the driving unit is positioned on one side of a center of the movable headlight unit and adjacent a mid-center plane in the width direction of the motorcycle.

15. The headlight device for the motorcycle as claimed in claim 14, wherein the movable headlight unit and the fixed headlight unit are disposed on right and left sides with respect to a mid-center plane in the width direction of the motorcycle.

16. A headlight device for a motorcycle which comprises:
   a pair of headlight units disposed laterally on right and left sides with respect to the motorcycle, in which at least one of those headlight units is a movable headlight unit including a light distribution adjusting mechanism for changing a range of illumination during a cornering of the motorcycle; and
   a bank angle detector for detecting a bank angle of the motorcycle,
   wherein the light distribution adjusting mechanism adjusts the movable headlight unit based on the detected bank angle, and the light distribution adjusting mechanism includes a light distribution changing mechanism configured for shifting to change the range of illumination and a driving unit for shifting the light distribution changing mechanism,
   wherein the light distribution adjusting mechanism also includes a position detector for detecting a position of the light distribution changing mechanism, and wherein at least one of the driving unit and the position detector is positioned on one side of a center of the movable headlight unit and adjacent a mid-center plane in the width direction of the motorcycle and wherein another of the pair of headlight units is fixed relative to the movable headlight unit and the bank angle detector calculates a bank angle from a rotational angular velocity and traveling velocity of the motorcycle.

* * * * *